United States Patent [19]

Bodlaj

[11] 4,266,875
[45] May 12, 1981

[54] METHOD AND DEVICE FOR CONTACT-FREE INTERVAL OR THICKNESS MEASUREMENT BY CONTROL OF THE DIRECTION OF A LIGHT RAY BEAM

[75] Inventor: Viktor Bodlaj, Munich, Fed. Rep. of Germany

[73] Assignee: Siemens Aktiengesellschaft, Berlin & Munich, Fed. Rep. of Germany

[21] Appl. No.: 118,778

[22] Filed: Feb. 5, 1980

[30] Foreign Application Priority Data

Feb. 20, 1979 [DE] Fed. Rep. of Germany ....... 2906494

[51] Int. Cl.$^3$ .............................................. G01S 9/62
[52] U.S. Cl. ......................................... 356/381; 356/1
[58] Field of Search ................... 356/381, 376, 375, 1; 350/355

[56] References Cited

U.S. PATENT DOCUMENTS

| 3,923,395 | 12/1975 | Bodlaj | 356/1 |
| 4,053,227 | 10/1977 | Bodlaj | 356/1 |

OTHER PUBLICATIONS

Bodlaj, V. *Siemens Forschungs–und Entwicklungsbericht* 1975, No. 6, pp. 336–344.
Bodlaj, V. "Lambda, a Laser Measuring System for the Differential Determination of Thickness", *Siemens Forschungs–und Entwicklungsbericht*, 1977, No. 3, pp. 180–188.

Primary Examiner—R. A. Rosenberger
Attorney, Agent, or Firm—Hill, Van Santen, Steadman, Chiara & Simpson

[57] ABSTRACT

A method and apparatus is disclosed for contact-free interval or thickness measurement. A sharply concentrated light beam is periodically deflected over a measuring space having a measuring plane and reference plane situated therein. A beam divider is positioned after the beam deflector and deflects the beam towards first, second and third light detectors. A fourth light detector is also provided to receive reflected light from the measuring plane and reference plane. A first time difference is utilized to control deflection frequency of the light beam; a second time difference controls deflection amplitude of the light beam; a third time difference determines a spacing of the measuring plane from the reference plane; and a fourth time difference corrects for changes in a direction of the light beam such as when a new light source is positioned in the system or when other directional errors occur.

6 Claims, 5 Drawing Figures

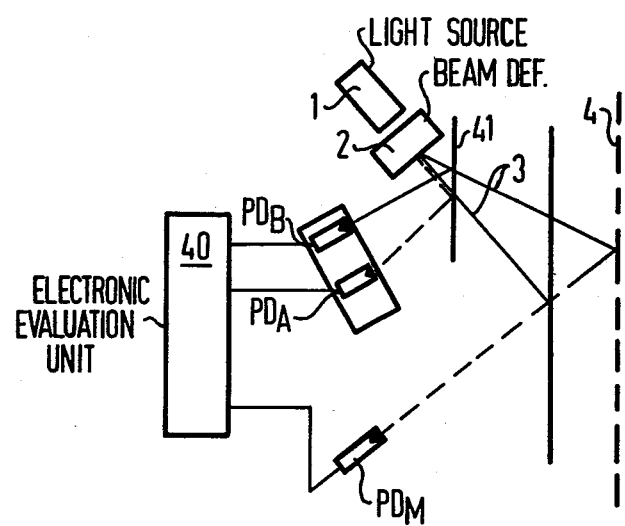

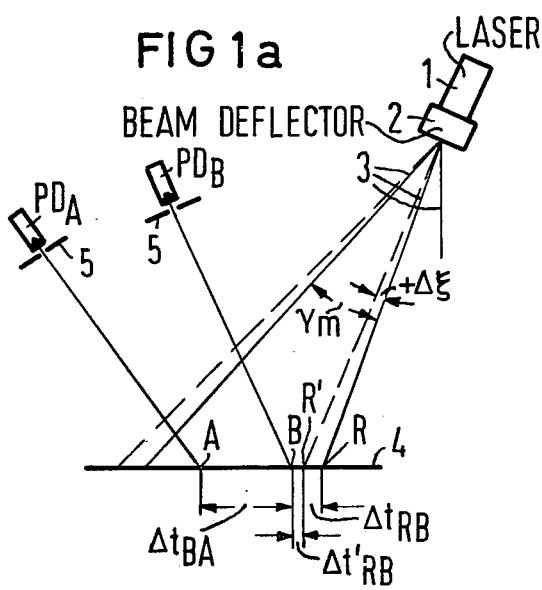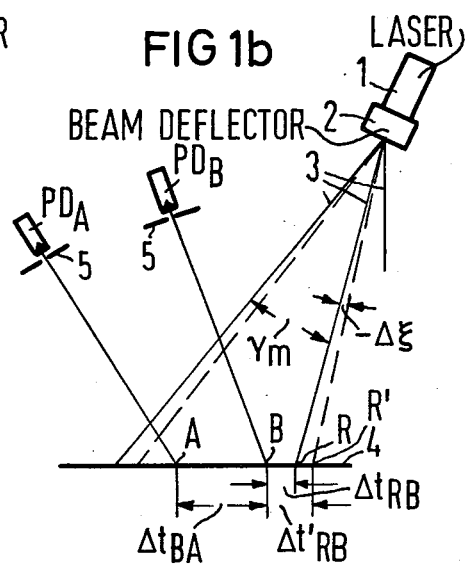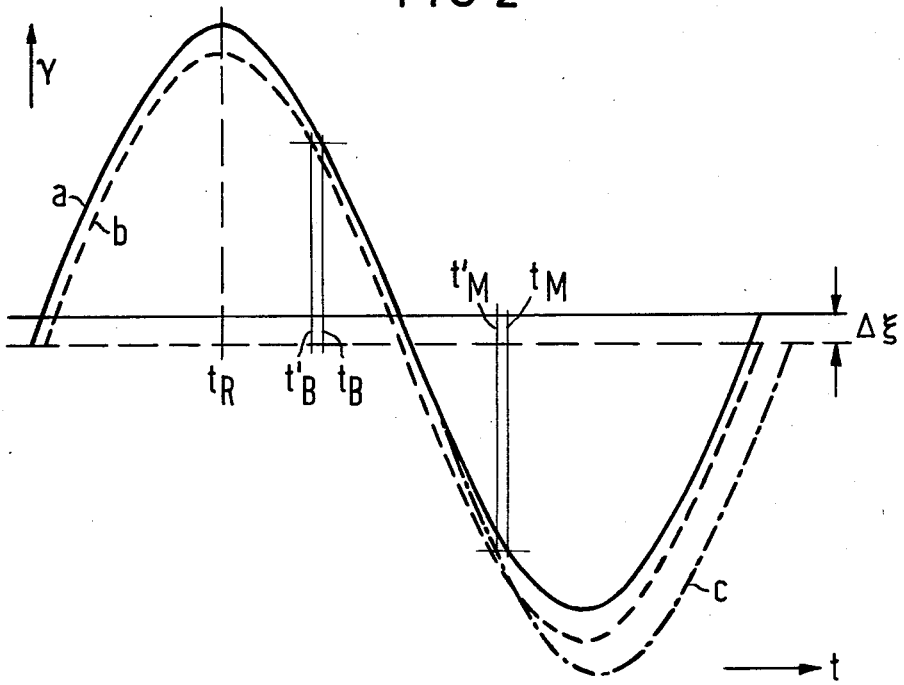

METHOD AND DEVICE FOR CONTACT-FREE INTERVAL OR THICKNESS MEASUREMENT BY CONTROL OF THE DIRECTION OF A LIGHT RAY BEAM

BACKGROUND OF THE INVENTION

The invention relates to a method for contact-free interval or thickness measurement in which a sharply concentrated light ray beam generated by a light source is periodically deflected by means of a beam deflector over a measuring space. A time difference between a standard and at least one measuring signal represents a measure of the interval or the thickness, and in which the time difference between a reference signal and the standard signal as well as between the standard signal and a first deflection signal is employed by means of comparison with two given fixed time differences for the control of the deflection frequency and the deflection amplitude of the light ray beam.

This method and the corresponding device for its implementation are known from the Siemens Forschungs- und Entwicklungsberichten, Volume 4, (1975), Number 6, pages 336–344 and Volume 6 (1977), Number 3, pages 180–188, incorporated herein by reference. The time difference between the reference signal and the standard signal holds the beam deflector at the resonant frequency. The time difference between standard and first deflection signals holds the deflection velocity constant. As long as the direction of the light ray beam does not change, the measuring time also remains stable given an unchanged interval.

It has been proven, however, that because of thermal influences of the beam deflector and on the light source, the direction of the light ray beam can change. Since the reference signal is generated independently of the direction of the light ray beam, given a change of direction, the time difference between a reference and a standard signal changes, since—depending on the displacement of the direction of the light ray beam by a positive or negative angle—the deflected light ray beam reaches the light-sensitive detector responsible for the standard signal in a shorter or longer time via reflection from a reference plane. This deviation of the measured time difference is compensated via a change of the deflection frequency. On the other hand, a changed deflection frequency changes the deflection time, i.e., the time difference between the standard and a first deflection signal. The time difference between standard and first deflection signal is again stabilized via a change of the deflection amplitude.

The changed deflection amplitude, however, changes the measuring time and thus causes a measuring error, above all in the upper measuring range.

To hold the direction of the light ray beam constant with opto-mechanical techniques in the beam deflector and in the light source would require an unjustifiable expense.

SUMMARY OF THE INVENTION

An object of the present invention, therefore, is to expand upon a method of the type described above such that a possible direction change of the light ray beam is opto-electronically corrected.

This object is inventively achieved in that a further time difference between the standard or first deflection signal and a further deflection signal is determined and is employed by means of comparison with a third prescribed, fixed time difference for controlling the direction of the light ray beam. It is exploited in this method that although given a sinusoidal deflection of the light ray beam with two different frequencies, it is possible by means of adaptation of the amplitudes to make the time for the traversal of the specific segment at both frequencies of equal size, but not the times for the traversal of two segments of different length. If, on the other hand, one can cause the times for the traversal of two segments of different lengths to be equal to two given time differences, then the frequency and the amplitude of the light ray beam of necessity corresponds to the frequency and amplitude of the required sine wave.

If, as a result of a directional change of the light ray beam, a frequency and amplitude change occurs, the direction of the light ray beam is corrected via the further measured time difference. Therefore, the proper frequency, i.e., the resonant frequency, and the preselected amplitude are again automatically set by means of the other measured time differences. A further advantage of this stabilized direction of the light ray beam is the problem-free replacement of, for example, the light source; the device need no longer be re-aligned.

In the devices for contact-free interval or thickness measurement known from the above-mentioned publications, a beam deflector follows the beam divider such as shown in FIG. 1 of the drawings. Two light-sensitive detectors PDA and PDB for determining the first measuring or deflection signal and standard signal are arranged in the area of the light ray beam divided by means of the beam divider as shown in FIG. 1. Moreover, at least one light-sensitive detector PDM is provided whose optical axis intersects the light ray beam in a zero plane 4 determined by means of the standard signal. An electronic evaluation unit 40 generates control signals for the deflection frequency and the deflection amplitude, and a value corresponding to the interval or the thickness from the detector signals. Therefore, time differences are first generated from the detector signals. These are represented in digital and analog form. Thus, an interval to be measured can be determined, for example, from the digital values with the assistance of a computer.

For implementation of the inventive method given such a device, it is provided that a third light-sensitive detector PDC (FIG. 3) is arranged in the area of the light ray beam which is divided out. The signal of this detector, together with the signal of the first or second detector, is supplied to a time discriminator whose output pulse can be converted via an impulse/digital converter and a digital/analog converter into a DC proportional to the time difference between the two signals. This DC is supplied to the input of a differential amplifier whose other input is connected to a fixed definable reference voltage. The output signal of the differential amplifier serves as the control signal for the direction of the light ray beam.

Thus, by use of low cost evaluation electronics and a single additional light-sensitive detector, it is possible to secure constant measurement independently of thermal changes at the device over a time that is as long as desired.

If a piezo-ceramic beam deflector is employed as the beam deflector, then a particularly simple control or, respectively, correction of the direction of the ray beam results since the output of the differential amplifier is directly connected to the piezo-ceramic beam deflector.

The AC voltage for generating the desired deflection frequency applied by the generator to the beam deflector is superimposed with a DC voltage in this manner. The beam deflector then no longer oscillates about its position of equilibrium. This direct correction of the direction of the light ray beam is particularly suited for small deviations.

A particularly favorable embodiment for larger deviations is that the output voltage of the differential amplifier is supplied to a motor potentiometer whose changeable center tap is connected to the piezo-ceramic beam deflector.

BRIEF DESCRIPTION OF THE DRAWINGS

FIG. 1 shows the prior art measuring device to which the invention is applied;

FIGS. 1A and 1B show the influence of directional change on time differences for stabilization of frequency and amplitude in the measurement device, and more specifically FIG. 1A shows the influence of a directional change by a positive angle, and FIG. 1B shows the influence of a directional change by a negative angle;

FIG. 2 shows the periodic deflection of the light ray beam for the correct direction, for a directional deviation, and the deflection corrected via the frequency and amplitude correction.

DESCRIPTION OF THE PREFERRED EMBODIMENTS

Figure 3:
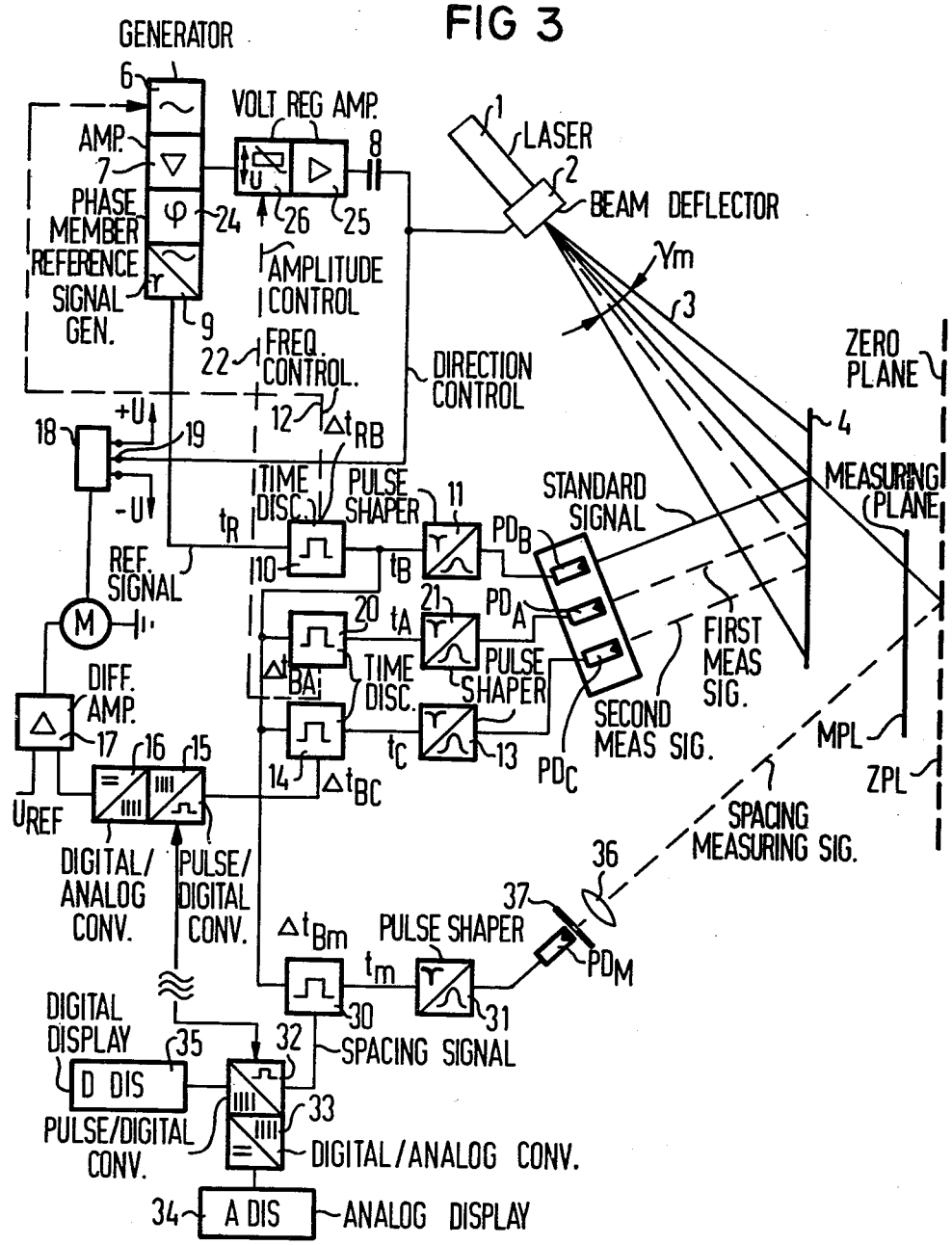
FIG. 3—limited to essential parts—shows the device for contact-free interval or thickness measurement with a control of the direction of the light ray beam according to the invention.

In FIGS. 1, 1A, and 1B, the light source, for example, a laser, is referenced 1. 2 is a piezo-ceramic beam deflector through which the light ray beam 3 passes. This light ray beam 3 strikes a reference plane 4 whose position is determined by means of a beam divider shown in FIG. 1. A photo diode $PD_B$ and a photo diode $PD_A$ with an aperture stop 5, are further illustrated as the first and second light-sensitive detectors.

This device of FIGS. 1, 1A, and 1B, and including the evaluation unit 40, corresponds to the prior art as is known, for example, from the Siemens Forschungs- und Entwicklungsbericht, Volume 4 (1975), Number 6, page 340, FIG. 8, incorporated herein by reference. The continuous lines of the light ray beam 3 are valid for the case in which the light ray beam has the correct direction. The broken lines in FIGS. 1A and 1B are valid for a deviation of a light ray beam from the prescribed direction. The light ray beam 3 is periodically sinusoidally deflected. Independently of the direction of the light ray beam, a reference signal is generated at a specific phase, for example, at a point in time when the light ray beam, given correct direction, strikes point R on the reference plane. The time difference $\Delta t_{RB}$ which the light ray beam requires in order to arrive from a point R on the reference plane 4 to a point B, in which a standard signal is emitted by photo diode $PD_B$, serves as a measure for the deflection frequency of the light ray beam. By controlling this time difference to a prescribed, fixed time difference, the beam deflector 2 is held at the resonant frequency.

When the light ray beam reaches point A on the reference plane 4, then the photo diode $PD_A$ emits a first measuring or deflection signal. The time difference $\Delta t_{BA}$ between the standard and the first measuring or deflection signal serves for the control of the deflection velocity (deflection amplitude). The evaluation unit 40 described in the above-mentioned publications performs this function. As long as the direction of the light ray beam has not changed, the measuring time also remains stable given an unchanged interval.

When, however, the light ray beam due to thermal influences on the beam deflector 2 and the laser 1 changes its direction by $+\Delta\S$, as is illustrated in FIG. 1A, then the deflection range $\gamma_m$ also rotates around this angle $\Delta\S$. Due to this directional displacement, the deflected light ray beam reaches the photo diode $PD_B$ via reflection at the reference plane 4 in a shorter time after the reference signal. The location R' which the light ray beam strikes on the reference plane 4 at the point in time of the reference signal is in close proximity to location B, in accord with angle $\Delta\S$. The time difference $\Delta t'_{RB}$ is thus smaller than the time difference $\Delta t_{RB}$. Via a reduction of the deflection frequency, this reduced time difference is again set to the original time difference $\Delta t_{RB}$. The lower deflection frequency, however, increases the deflection time between points B and A. This increased deflection time is again returned to the prescribed deflection time $\Delta t_{BA}$ via an increase of the deflection amplitude and, thus, deflection velocity.

A change of the direction of the light ray beam by an angle $-\Delta\S$ is accordingly illustrated in FIG. 1B. This change results in the fact that a smaller deflection amplitude occurs via the stabilization of the time difference $\Delta t_{BA}$.

The effects of this readjustment of the deflection frequency and of the deflection amplitude on the measuring time given a directional change of the light ray beam are illustrated in FIG. 2. There, the deflection angle $\gamma$ over time t is illustrated for the periodic deflection of the light ray beam. The continuous sinusoidal curve "a" shows the normal deflection of the light ray beam without directional deviation. The broken curve "b" shows the periodic deflection given a directional deviation of the light ray beam by the angle $+\Delta\S$. The dot-dash curve "c" shows the curve with increased deflection amplitude and reduced frequency established via the stabilization of the time differences $\Delta t_{RB}$ and $\Delta t_{BA}$. Further, the times for the reference signal, the standard signal, and the actual measuring signal are indicated. As can be derived from this figure, the increased deflection amplitude shortens the measuring time $(t_{M'} - t_B < t_M - t_B)$ and thus causes a measuring error, above all in the upper measuring range.

In FIG. 3, the known device is represented again as it was in FIGS. 1a and 1b. The same parts are provided with the same reference symbols. Further, in a simplified form, a generator 6 is represented which drives the beam deflector 2 via a first amplifier 7, a voltage regulator 26, a further amplifier 25 and a capacitor 8. On the other side, as a reference signal, a needle pulse is generated by the generator signal via the amplifier 7, a phase member 24 and a pulse generator 9 at the point in time $t_R$. This pulse is supplied to a time discriminator 10, to which on the other side at the point in time $t_B$ a needle pulse which is generated from the standard signal of the photodiode $PD_B$ is supplied via a pulse shaper 11. In the time discriminator 10 thereby a pulse arises with the pulse duration $\Delta t_{RB}$, which is used for the controlling of the generator frequency—as is indicated by the effect line 12.

Correspondingly, needle pulses are fed to the time discriminator 20 at the points in time $t_B$ and $t_A$, which pulses were formed from the standard signal and first measuring signal of the photodiodes $PD_B$ and $PD_A$, respectively. This discriminator 20 delivers a pulse with the duration $\Delta t_{BA}$, which serves for the controlling of the deflection amplitude—as is indicated by the effect line 22.

For the correction of the change of direction of the light ray bundle 3, an additional photodiode $PD_C$ is provided, a second measuring signal of which is supplied to a further time discriminator 14 via a pulse shaper 13. At time $t_B$, the needle pulse of the pulse shaper 11 is supplied to this time discriminator. In the time discriminator 14 thereby a pulse with the duration $\Delta t_{BC}$ arises. This is first digitalized in a pulse/digital converter 15 and is converted into a DC voltage proportional to the digital number in a subsequent digital-/analog converter 16. This DC voltage is compared in a differential amplifier 17 to a reference voltage $U_{Ref}$. The output of the differential amplifier 17 is employed for the control of a motor potentiometer 18 which has a symmetrical voltage supply with the voltages $\pm U$. The changeable center tap 19 of the potentiometer is connected to the beam deflector 2 so that the correction voltage generated in the motor potentiometer is superimposed on the AC voltage of the generator 6 in the case of a deviation. For smaller deviations, it would be just as conceivable to employ the output voltage of the differential 17 directly for the directional correction of the beam deflector 2. A directional correction of the light source 1 would be just as possible.

The reference voltage $U_{Ref}$ supplied to the differential amplifier 17 is selected in such manner that the output voltage of the differential amplifier is zero for a specific direction of the light ray beam 3. If, for example, the direction of the light ray beam changes by $+\Delta \xi$, a greater deflection amplitude occurs via the stabilization of the time differences $\Delta t_{RB}$ and $\Delta t_{BA}$. As a result, the time difference $\Delta t_{BC}$ becomes shorter and the DC voltage after the digital/conversion becomes smaller. A negative DC voltage corresponding to the shortened time difference arises at the output of the differential amplifier 17. Given a directional change of the light ray beam by a negative angle, a positive DC voltage correspondingly occurs.

A high stability and reproduceability of the measured values as well as a high resolution can be achieved with the described additional stabilization of the direction of the light ray beam.

Further, in FIG. 3, a theoretical zero plane ZPL as well as a measured plane MPL are drawn in. The zero plane ZPL is selected such that at the point in time in which the light beam reflected at the beam divider 4 falls upon the photodiode $PD_B$, the partial beam which passes through intersects with the optical axis of a further photodetector $PD_m$ in this plane. For the more precise determination of the optical axis, an aperture diaphragm 37 and a convex lens 36 are arranged in front of the detector $PD_m$.

Via a pulse shaper 31, at the point in time $t_m$, in which the light reflected from the measured plane falls upon the detector $PD_m$ to create a spacing measuring signal, a needle pulse is supplied to a time discriminator 30, which already received a corresponding pulse at the point in time $t_B$. The output pulse of the time discriminator 30 has a pulse duration $\Delta t_{Bm}$, which is a measurement for the spacing of the measured plane MPL from the zero plane ZPL.

Via a pulse-digital converter 32 and a digital display 35 or an additional digital-analog converter 33 and an analog display 34, the measured value can be given.

In FIG. 3, the pulse shapers 11, 13, 21 and 31 are shown in simplified form and can be composed of a series of components as, for example, shown in FIG. 8 of the reference Siemens Forschungs- und Entwicklungsberichten, discussed above.

In the sample embodiment according to FIG. 3, the time differences between the standard and second measuring signals of detectors $PD_B$ and $PD_C$ have been employed for the control of the direction of the light ray beam 3. The control is likewise possible when the first measuring signal of detector $PD_A$ is employed instead of the standard signal from $PD_B$.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for contact-free interval or thickness measurement, comprising the steps of:
    providing a sharply concentrated light ray beam generated by a light source and periodically deflecting it over a measured space by means of a beam deflector;
    a measuring plane being positioned in the measuring space and spaced from a reference plane by the interval or thickness to be measured;
    providing first, third and fourth light beam detectors positioned to receive reflections of the light beam from a beam divider and a second light beam detector positioned to receive reflections from the measuring and reference planes;
    measuring the interval or thickness by use of a time difference between a standard signal from the first detector and at least one spacing measuring signal from the second detector;
    controlling deflection frequency of the light beam by use of a time difference between a reference signal derived from a generator controlling deflection frequency and said standard signal;
    controlling deflection amplitude of the light beam by use of a time difference between said standard signal and a first measuring signal derived from the third light detector; and
    controlling a direction of the light ray beam by use of a time difference between one of said standard and first measuring signals and a second measuring signal derived from the fourth light detector, the direction of the light ray beam being corrected when this time difference deviates from a given reference value.

2. The method of claim 1 including the steps of utilizing the time difference for control of the light beam direction to control a variable voltage source which superimposes a correction voltage upon a periodic deflection voltage resulting from the deflection frequency generator.

3. A device for contact-free interval or thickness measurement, comprising:
    light source means for generating a light beam;
    beam deflecting means for periodically deflecting the beam over a measuring space having a measuring plane therein spaced from a reference plane;
    a beam divider following the beam deflector;

first, second, and third light detectors positioned to receive a beam divided out from the beam divider and a fourth light detector positioned to receive light reflected from the measuring plane and reference plane;

spacing measurement means for determining a spacing between the measuring plane and reference plane by creating of a time difference between a standard signal from the first detector and a spacing measuring signal from the fourth detector;

deflection frequency control means connected for control of beam deflection frequency to the beam deflecting means by creating a time difference between a reference signal derived from a generator controlling periodic deflection and said standard signal;

means for controlling deflection amplitude of the light beam connected to means for establishing beam deflector amplitude by creating a time difference between said standard signal and a first measuring signal derived from the second light detector; and means for directional control of the light ray beam connected to the beam deflecting means for establishing beam direction and controlling the direction by creating a time difference through a comparison of one of said standard and first measuring signals and a second measuring signal derived from the third light detector.

4. The device of claim 3 wherein the means for directional control of the light beam comprises a time discriminator connected to the second measuring signal and one of the standard and first measuring signals, an output pulse of the time discriminator connecting to a pulse/digital converter and thereafter to a digital/analogue converter which has a DC voltage output supplied to a differential amplifier also connected to a fixed reference voltage, and an output of the differential amplifier providing a control signal for the beam deflecting means.

5. A device according to claim 4 wherein the output of the differential amplifier directly connects to a piezoceramic beam deflector.

6. A device according to claim 4 wherein an output voltage of the differential amplifier is supplied to a motor potentiometer whose moving center tab controlled by the motor is connected to the beam deflecting means.

* * * * *